United States Patent [19]

Sabia

[11] Patent Number: 4,464,013
[45] Date of Patent: Aug. 7, 1984

[54] FILLED OPTICAL FIBER CABLES

[75] Inventor: Raffaele A. Sabia, Atlanta, Ga.

[73] Assignee: AT&T Bell Laboratories, Murray Hill, N.J.

[21] Appl. No.: 362,603

[22] Filed: Mar. 29, 1982

[51] Int. Cl.³ .................................................. G02B 5/14
[52] U.S. Cl. ................................ 350/96.23; 174/25 C; 524/474
[58] Field of Search ...................... 350/96.23, 96.34; 524/474; 174/23 C, 25 C

[56] References Cited

U.S. PATENT DOCUMENTS

| 3,607,487 | 9/1971  | Biskeborn et al. | 156/47    |
|-----------|---------|------------------|-----------|
| 3,717,716 | 2/1973  | Biskeborn et al. | 174/23 C  |
| 3,879,575 | 4/1975  | Dobbin et al.    | 174/92    |
| 3,944,717 | 3/1976  | Hacker et al.    | 174/23 C  |
| 4,176,240 | 11/1979 | Sabia            | 174/23 C  |
| 4,241,979 | 12/1980 | Gagen            | 350/96.23 |
| 4,259,540 | 3/1981  | Sabia            | 350/96.23 |
| 4,324,453 | 4/1982  | Patel            | 350/96.23 |

OTHER PUBLICATIONS

Kraton Thermoplastic Rubber Crumb, Shell Chemical Co., pp. 1-7, 9-21, 23-29, 31-39 and 41.
Kraton Rubber, "Typical Property Guide for Kraton and Kraton G Rubber", Shell Chemical Co., Mar. 1977.
Technical Bulletin, "Kraton G Thermoplastic Rubber for Sealants, Adhesives, and Related Materials", Shell Chemical Co., Oct. 1975, pp. 3-19.

*Primary Examiner*—John D. Lee
*Assistant Examiner*—Robert E. Wise
*Attorney, Agent, or Firm*—James H. Fox

[57] ABSTRACT

A filling composition comprising a styrene-rubber-styrene block copolymer and an oil is used to prevent water entry into optical fiber cable. The composition provides:
(1) suitably low viscosity to allow filling the cable at elevated temperatures;
(2) low modulus to minimize microbending loss in the optical fibers; and
(3) high slump temperature to minimize flow of the material at an elevated service temperature from the end of a filled cable.

2 Claims, No Drawings

FILLED OPTICAL FIBER CABLES

BACKGROUND OF THE INVENTION

1. Field of the Invention

This invention relates to a cable, comprising one or more optical fibers, that is at least partially filled with a waterproofing compound.

2. Description of the Prior Art

Optical fiber cables typically include a sheath that is designed to surround and protect one or more optical fibers located therein. One type of optical fiber cable construction is shown in U.S. Pat. No. 4,241,979, coassigned with the present invention. In that cable, one or more optical fibers are placed within an inner sheath. A space between the fibers and the sheath prevents longitudinal forces from the sheath from substantially acting on the fibers. Various other cable designs are proposed, or in use, for optical fiber cables, including designs wherein the fibers are arranged in a groove surrounding a central strength member, among others.

To prevent water entry into cables, there has come into use various filling compounds for filling the voids within a typical cable. Filling materials have included petroleum jelly mixed with a polymer, usually polyethylene, as described in U.S. Pat. Nos. 3,607,487 and 3,717,716. Other filling materials have included a low viscosity oil gelled by a styrene-isoprene-styrene copolymer, again with polyethylene added to impart consistency and reduce slump; see, for example, U.S. Pat. No. 3,879,575. Most recently, an improved filling material having superior handling characteristics comprising a styrene-ethylene-butylene-styrene block copolymer and mineral oil with polyethylene added for consistency has been described in U.S. Pat. No. 4,176,240, coassigned with the present invention.

While the above-noted filling material has proved satisfactory in many cases, special attention to the peculiar characteristics of optical fibers requires that in some cases new filling materials are desirable. In particular, optical fibers have a requirement that microbending loss be minimized. Microbending losses increase the attenuation of the optical radiation in the fibers, limiting the length of transmission in a fiber; see, for example, Gardner, "Microbending Loss in Optical Fibers," *Bell System Technical Journal*, Vol. 54, No. 2, pages 457-465 (1975).

In the case of filled cables, a temperature change that causes a large compressive strain on the fibers due to the coupling with the filling compound can increase microbending loss. Therefore, it is desirable that the filling material have a low modulus to reduce the resulting strain on an optical fiber coupled thereto. However, the other desirable characteristics of a filling material should be maintained. For example, the material should not slump excessively at elevated service temperatures, so that the material will not migrate out of the end of the cable. The material should not be oily or greasy, but should have a soft-rubber texture to allow for convenient handling during cable repair and other operations. Furthermore, the viscosity of the material should be sufficiently low so that the cable can be filled rapidly with the filling material during manufacture of the cable.

SUMMARY OF THE INVENTION

I have invented an improved filling material for waterproofing optical fiber cables. The improved material comprises a mixture of (1) from 85 to 94 percent by weight of ASTM Type 103, 104A, or 104B, or mixtures thereof, naphthenic or paraffinic oil having a minimum specific gravity of 0.855; a minimum SUS viscosity at 210 degrees F. of 40; a maximum pour point ASTMD 97 of less than $-5$ degrees F.; and a maximum of 5 percent aromatic oils; and (2) from 6 to 15 percent by weight of a styrene-ethylenebutylene-styrene block copolymer having a styrene-rubber ratio of from approximately 0.2 to 0.5. These two ingredients comprise substantially 100 percent of the filling material, but with up to 1 weight percent of the filling material being stabilizer.

DETAILED DESCRIPTION

The following detailed description relates to waterproofed optical fiber cables having an improved filling compound.

Several objectives are identified in approaching this development: (1) compatibility with cable materials: (2) compatibility with current optical fiber processing methods; (3) water resistance performance; (4) craft acceptability; (5) high temperature resistance to flow; and (6) low relaxation modulus, to minimize added microbending loss, over the temperature of interest, typically $-40$ to 170 degrees F.

Styrene block compolymers with a rubber midblock are thermoplastic rubbers. That is, at high processing temperatures, they act as thermoplastics. At low use temperature, they act as rubbers. The midblock may be an unsaturated rubber such as polybutadiene or polyisoprene or a saturated rubber such as an ethylene-butylene copolymer. The saturated rubbers exhibit better thermal and aging characteristics, and are preferred in this work.

In the case of block copolymers, additives may selectively modify the rubber or styrene blocks. Oils, compatible with the rubber block, can be added to reduce the viscosity. These oils also reduce properties associated with the styrene blocks, such as tear strength and the high temperature slump properties. In the prior art, as in the above-noted U.S. Pat. No. 4,176,240, polyethylene is added to improve the high temperature properties without increasing the processing viscosity significantly.

In considering formulations for filling fiber optic cable, tacky formulations were avoided since they present handling problems in terminating a cable. Also, the modulus profile of these formulations may be more temperature dependent. Resins which modify the styrene blocks were not used since these increase the application (processing) temperature. Formulations which can be applied at low temperatures are preferred. Such formulations are less likely to damage the optical fiber, and minimize thermal stresses due to shrinkage. For filling an optical fiber cable having fibers within an inner sheath, such as described in above-noted U.S. Pat. No. 4,241,979, a filling material viscosity of less than 4000 cps at the processing (cable filling) temperature is desirable.

The starting materials for evaluation are listed in Table I:

TABLE I

| Material | MATERIALS Type | Supplier |
|---|---|---|
| Thermoplastic Rubber | Kraton G 1652 | Shell |

TABLE I-continued

| Material | MATERIALS Type | Supplier |
|---|---|---|
| Extender Oils | Kraton G 1650 Sunpar LW 120 Drakeol 35 | Suntech Group |
| Polyethylene Wax | AC-9A | Allied |
| Compatibilizer | Kronitex 100 | FMC |
| Stabilizer | Irganox 1035 | Ciba Geigy |

The compositions studied are listed in Table II:

TABLE II

| | COMPOSITIONS Parts By Weight | | | | | | | | | |
|---|---|---|---|---|---|---|---|---|---|---|
| Materials | A | B | C | D | E | F | G | H | I | J |
| Kraton G 1652 | 6 | | | | | | | | | |
| Kraton G 1650 | | 7 | 10 | 15 | 7 | 10 | 15 | 7 | 10 | 15 |
| Sunpar LW 120 | 89 | 93 | 90 | 85 | | | | | | |
| Drakeol 35 | | | | | 93 | 90 | 85 | 89 | 86 | 81 |
| AC9 | 4.5 | | | | | | | 4 | 4 | 4 |
| Kronitex 100 | 0.5 | | | | | | | | | |
| Irganox 1035 | 0.2 | 0.2 | 0.2 | 0.2 | 0.2 | 0.2 | 0.2 | 0.2 | 0.2 | 0.2 |

They were blended at 120–140 degrees C. The formulations were characterized for slump temperature and for viscosity at processing temperatures. Mechanical properties were obtained with a Thermo Mechanical Spectrometer in the parallel plate mode. A summary of the properties of the formulations is presented in Table III.

TABLE III

| | PROPERTIES | | | | | | | | | |
|---|---|---|---|---|---|---|---|---|---|---|
| Viscosity at | A | B | C | D | E | F | G | H | I | J |
| 266° F. (130° C.) cps | 30 | 42 | 130 | 1140 | 56 | 203 | 1760 | 78 | 341 | 3800 |
| Slump Temps, °C. | | | | | | | | | | |
| Pass | 65 | 50 | 60 | 75 | 50 | 65 | 75 | 70 | 75 | 90 |
| Fail | 70 | 60 | 65 | 80 | 60 | 70 | 80 | 75 | 80 | 95 |
| $G'(\omega)$ ($10^6$ dynes/cm$^2$ at $10^2$ rad/sec) | 30 | 16.2 | 12.6 | 7.10 | 0.62 | 1.05 | 2.8 | 3.9 | 5.9 | 9.4 |

In general, the modulus of materials increases as the temperature decreases. Since fiber optic cables are being designed for an environment ranging from −40 to 170 degrees F., the initial characterization was done at −40 degrees F. The value of $G'(\omega)$ (the dynamic shear modulus) as a function of frequency was measured for blends A-J. For filling an optical fiber cable, a suitable filling composition should have a tensile modulus of less than $10^7$ dynes/cm$^2$ at −40 degrees F. This is approximately equivalent to a shear modulus limit of less than $3.3 \times 10^6$ dynes/cm$^2$ at $10^2$ rad/sec. This criterion provides for minimal additional loss due to microbending in optical fibers in a filled cable structure.

To reduce the modulus below that of blend A, a typical prior art formulation, the level of Kraton G 1652 can be reduced. This is not desirable, since the resulting formulation will be grease-like and oily. Alternatively, the polyethylene wax can be removed. Without the polyethylene, the high temperature properties are degraded. However, the latter approach was chosen since I have found that the high temperature properties can be sufficiently restored by increasing the rubber content. Kronitex 100, which controls oil synerisis, was omitted in the remaining blends (B-J), since experience has shown that at higher rubber content, oil synerisis does not occur.

To compensate for the loss of polyethylene, a higher molecular weight block copolymer, Kraton G 1650, was blended at three levels (blends B, C, and D), Table II. Depending on the rubber content, the slump of B, C, and D bracket that of blend A. The higher viscosities reflect the higher rubber content as well as the use of Kraton G 1650. As expected, the moduli of B, C, and D at −40 degrees F. are less than those of blend A. Surprisingly, the modulus decreases as the rubber content increases. The explanation is that at −40 degrees F., the oil, Sunpar LW 120, is a bigger contributor to the modulus than the rubber. That is, at −40 degrees F., components in the oil are probably crystallizing out or the molecular chains stiffen.

Sunpar LW 120 has a nominal pour point of +10 degrees F. Since Drakeol 35 has a nominal pour point of about −15 degrees F., blends E, F, and G in Table II were made with Drakeol 35. The change in oil produces an increase in the modulus as the rubber content is increased. I estimate that an oil having pour point of less than −5 degrees F. (ASTMD 97) is suitable for obtaining a filling material having low modulus down to about −40 degrees F. when used with the styrene-rubber-styrene block copolymer.

The viscosity of blends based on Drakeol 35 is higher than the one based on Sunpar LW 120, since Drakeol 35 is more viscous. The addition of polyethylene to the Drakeol 35 compositions, blends H, I, and J in Table II, increases the modulus. As expected, the slump temperatures increase with polyethylene content. Furthermore, on addition of polyethylene, the viscosity change in greater than expected, based on the viscosity of the polyethylene (1080 cps at 266 degrees F.).

The stress relaxation behavior of the filling compound is of fundamental interest. On stressing, these materials will undergo stress relaxation. In the case of blend E, the material at room temperature will behave like a rubber. However, if held at constant strain at 25 degrees C., blend E will relax, and will typically be stress-free after about 300 hours. This implies that added microbending losses will reduce to approximately zero after about 300 hours using blend E as a filling compound. Temperature excursions will increase or decrease this relaxation time.

Based on the above, it is apparent that formulations comprising from 6 to 15 percent block copolymer material, and from 94 to 85 percent oil, are suitable for optical fiber filling material. (While the use of Kraton G 1650 has been shown, Kraton G 1652 can alternately be used in the above composition range. However, a higher level of G 1652 is required to obtain performance equivalent to that obtained for a given level of G 1650.)

The total of the oil and block copolymer components is at least 99 percent of the total filling material, with up to 1 percent of the filling being an thermal oxidative stabilizer. Composition E is the presently preferred formulation, due to its low modulus at temperatures down to −40 degrees F. In addition, it has a viscosity at 100 degrees C. of typically about 560 cps, suitable for filling a typical cable having fibers within an inner sheath. For a 93/7 composition (blend E), the viscosity at 100 degrees C. can be as high as 2600 cps, depending on the viscosity of the particular lot of Kraton G 1650. I recommend choosing the block copolymer by mixing it 20 percent by weight in toluene at 25 degrees C.; the viscosity of the solution is desirably less than 1500 cps to give satisfactory performance in blend E.

The slump temperature limit of composition E of about 50 degrees C. is suitable for most buried cable applications. For applications requiring a higher slump temperature, the formulations F and G are suitable. Typical applications for these include serial cables or those placed in underground steam ducts.

It is apparent that various optical fiber cable designs can benefit from the filling compositions of the present invention.

What is claimed is:

1. A cable comprising one or more optical fibers contained within a sheath leaving voids between the fibers and the sheath, and a filling material at least partially filling the voids, characterized in that the filling material comprises a mixture of (1) 85 to 94 weight percent ASTM Type 103, 104A, or 104B, or mixtures thereof, paraffinic or napthenic oil having a minimum specific gravity of 0.855; a minimum SUS viscosity at 210 degrees F. of 40; and a maximum pour point ASTMD 97 of −5 degrees F.; and a maximum of 5 percent aromatic oils; (2) from 6 to 15 weight percent of a styrene-ethylene-butylene-styrene block copolymer having a styrene-rubber ratio of approximately 0.2 to 0.5; with the foregoing ingredients (1) and (2) comprising at least 99 weight percent of said filling material, and further comprising up to 1 weight percent thermal oxidative stabilizer.

2. The cable of claim 1 wherein said filling material comprises approximately 93 weight percent oil, approximately 7 percent copolymer, and approximately 0.2 percent oxidative stabilizer by weight.

* * * * *

UNITED STATES PATENT AND TRADEMARK OFFICE
CERTIFICATE OF CORRECTION

PATENT NO.  : 4,464,013
DATED       : August 7, 1984
INVENTOR(S) : Raffaele A. Sabia It is certified that error appears in the above-identified patent and that said Letters Patent is hereby corrected as shown below:

Column 2, line 12, "fillihg" should read --filling--;
          line 20, "are" should read --were--;
          line 21, ":" (2nd occurrence) should read --;--,
          line 28, "compolymers" should read --copolymers--.
Column 4, line 22, before "pour" add --a--;
          line 47, "in" should read --is--.
Column 5, line 20, "serial" should read --aerial--.

Signed and Sealed this

Fifth Day of March 1985

[SEAL]

Attest:

DONALD J. QUIGG

*Attesting Officer*   Acting Commissioner of Patents and Trademarks